UNITED STATES PATENT OFFICE.

ESTA A. MAKEPEACE, OF ELDORADO, KANSAS.

COMPOUND FOR PRESERVING EGGS.

No. 800,661.     Specification of Letters Patent.     Patented Oct. 3, 1905.

Application filed July 25, 1905. Serial No. 271,251.

*To all whom it may concern:*

Be it known that I, ESTA A. MAKEPEACE, a citizen of the United States, residing at Eldorado, in the county of Butler and State of Kansas, have invented certain new and useful Improvements in Compounds for Preserving Eggs; and I do hereby declare the following to be a full, clear, and exact description of the invention, such as will enable others skilled in the art to which it appertains to make and use the same.

This invention relates to new and useful improvements in compounds for preserving eggs; and the object of the invention is to produce a material which will so act upon the pores of eggs as to exclude air from passing through the shells thereof, thereby affording means for keeping the eggs indefinitely.

The invention comprises the utilization of various ingredients, which are compounded in various proportions, as will be hereinafter described.

In making my compound I take one part each of magnesia, borax, and tartrate of potash, two parts of chlorid of sodium, or common salt, four parts of oxid of calcium, and twenty-four parts of water. These ingredients are mixed together thoroughly, after which the eggs are immersed in the fluid mixture and caused to remain under the surface thereof, thereby forming means for closing the pores of the eggs and preventing any air from passing through the same.

I have found that by the treatment of eggs by this solution they will keep for many months apparently as fresh as when first laid.

Having thus described my invention, what I claim to be new, and desire to secure by Letters Patent, is—

A compound for preserving eggs, made up of one part each of magnesia, borax and tartrate of potash, two parts of chlorid of sodium, four parts of oxid of calcium and twenty-four parts of water, as set forth.

In testimony whereof I hereunto affix my signature in the presence of two witnesses.

ESTA A. MAKEPEACE.

Witnesses:
    WM. E. McGINNIS,
    IRA E. McGINNIS.